(12) United States Patent
Norwood et al.

(10) Patent No.: US 8,940,807 B2
(45) Date of Patent: Jan. 27, 2015

(54) METHOD FOR PRODUCING METAL OXIDE ORGANIC COMPOUND COMPOSITE

(75) Inventors: Robert Andrew Norwood, Tucson, AZ (US); Douglas A. Loy, Tucson, AZ (US); Roland Himmelhuber, Tucson, AZ (US); Jun Kato, Tucson, AZ (US)

(73) Assignees: Canon Kabushiki Kaisha, Tokyo (JP); The Arizona Board of Regents on behalf of the University of Arizona, Tucson, AZ (US)

( * ) Notice: Subject to any disclaimer, the term of this patent is extended or adjusted under 35 U.S.C. 154(b) by 492 days.

(21) Appl. No.: 13/049,602

(22) Filed: Mar. 16, 2011

(65) Prior Publication Data

US 2012/0238700 A1 Sep. 20, 2012

(51) Int. Cl.
| | |
|---|---|
| *C08F 2/48* | (2006.01) |
| *C08F 2/46* | (2006.01) |
| *C08F 2/44* | (2006.01) |
| *C08K 3/22* | (2006.01) |
| *C08F 220/30* | (2006.01) |
| *C08F 220/32* | (2006.01) |

(52) U.S. Cl.
CPC ...... *C08F 2/48* (2013.01); *C08F 2/44* (2013.01); *C08F 2220/301* (2013.01); *C08F 2220/325* (2013.01); *C08K 3/22* (2013.01)
USPC ............ 522/84; 522/71; 524/800; 524/847; 524/853

(58) Field of Classification Search
None
See application file for complete search history.

(56) References Cited

U.S. PATENT DOCUMENTS

| 3,291,579 | A | * | 12/1966 | Mulaskey | 44/266 |
|---|---|---|---|---|---|
| 3,458,306 | A | * | 7/1969 | Lindquist | 75/365 |
| 3,625,673 | A | * | 12/1971 | Lindquist | 419/30 |
| 3,655,360 | A | * | 4/1972 | Lindquist | 419/19 |
| 6,355,821 | B1 | * | 3/2002 | Koplick et al. | 556/57 |
| 2010/0134888 | A1 | | 6/2010 | Korenaga et al. | |
| 2010/0179288 | A1 | * | 7/2010 | Leventis et al. | 525/424 |
| 2012/0115989 | A1 | * | 5/2012 | Tuncer et al. | 523/427 |

FOREIGN PATENT DOCUMENTS

JP 4077508 B2 4/2008

OTHER PUBLICATIONS

Gash, A. E.; Tillotson, T. M.; Satcher, J. H.; Poco, J. F.; Hrubesh, L. W.; Simpson, R. L., "Use of epoxides in the sol-gel synthesis of porous iron (III) oxide monoliths from Fe (III) salts." Chem. Mater. 2001, 13, 999.

Gash, A. E.; Tillotson, T. M.; Satcher, J. H.; Hrubesh, L. W.; Simpson, R. L., "New sol-gel synthetic route to transition and main-group metal oxide aerogels using inorganic salt precursors." J. Non-Cryst. Solids 2001, 285, 22.

Reibold, R. A.; Poco, J. F.; Baumann, T. F.; Simpson, R. L.; Satcher, J. H, "Synthesis and characterization of a nanocrystalline thoria aerogel." J. Non-Cryst. Solids 2004, 341, 35.

* cited by examiner

*Primary Examiner* — Michael J Feely
(74) *Attorney, Agent, or Firm* — Canon U.S.A. Inc., IP Division

(57) ABSTRACT

A method for obtaining a metal oxide organic compound composite includes dissolving a hydrated yttrium chloride and an epoxide in a solvent, and obtaining a gel including the metal oxide organic compound composite.

8 Claims, 1 Drawing Sheet

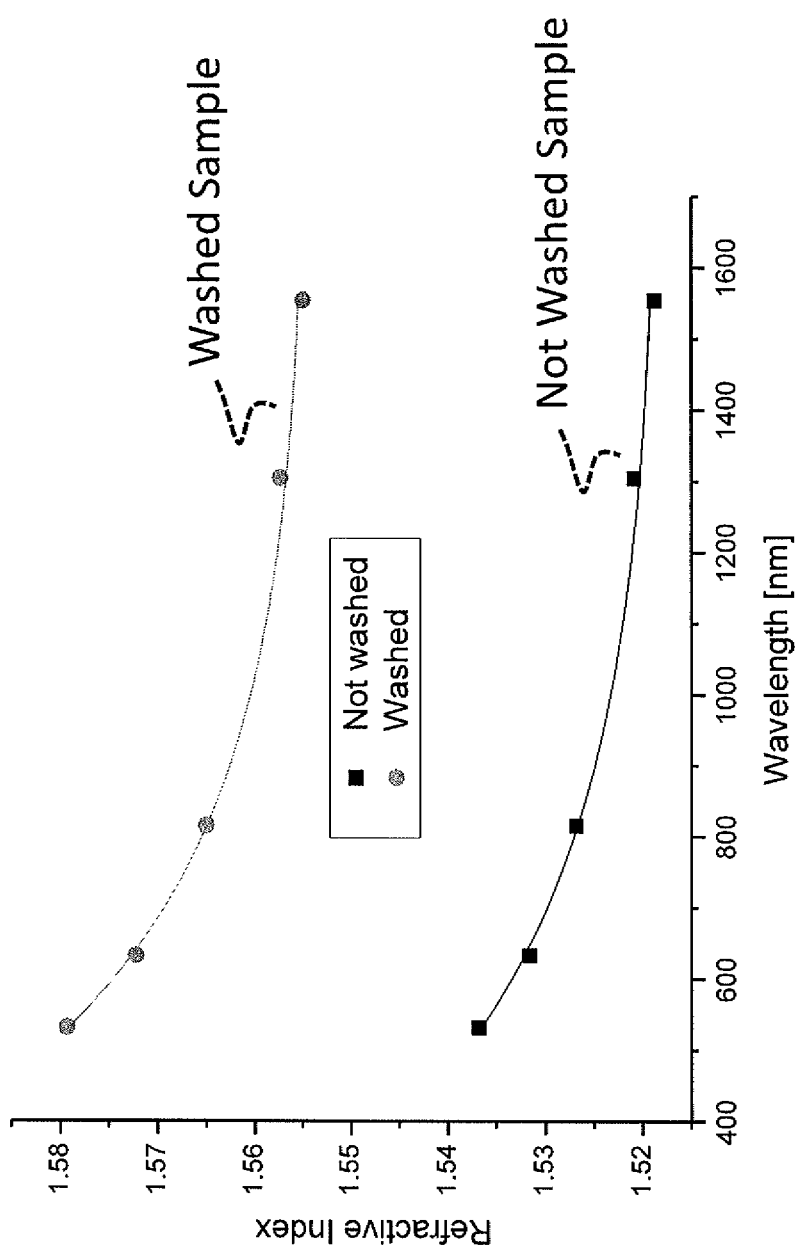

METHOD FOR PRODUCING METAL OXIDE ORGANIC COMPOUND COMPOSITE

BACKGROUND OF THE INVENTION

1. Field of the Invention

The present invention relates to a method for producing a metal oxide organic compound composite.

2. Description of the Related Art

A sol-gel synthesis method using epoxides has been developed by Gash et al. (Gash, A. E.; Tillotson, T. M.; Satcher, J. H.; Poco, J. F.; Hrubesh, L. W.; Simpson, R. L., "Use of epoxides in the sol-gel synthesis of porous iron (III) oxide monoliths from Fe (III) salts." Chem. Mater. 2001, 13, 999). While Gash et al. discloses a sol-gel synthesis method, further research is required to obtain novel materials with desirable properties.

SUMMARY OF THE INVENTION

The present invention provides a new method for producing a metal oxide organic compound composite.

According to an aspect of the present invention, a method for obtaining a metal oxide organic compound composite includes dissolving a hydrated yttrium chloride and an epoxide in a solvent, and obtaining a gel including the metal organic compound composite.

According to another aspect of the present invention, a method for producing a metal oxide organic compound composite includes dissolving a metal chloride in a presence of an epoxide having a first refractive index to obtain a gel, and washing the gel with a solution including a material having a second refractive index different from the first refractive index of the epoxide.

According to another aspect of the present invention, a method for producing a metal oxide organic compound composite includes dissolving a metal chloride in a presence of an epoxide to obtain a gel with a refractive index, and replacing the epoxide of the gel with a material to change the refractive index.

Further features of the present invention will become apparent from the following description of exemplary embodiments with reference to the attached drawings.

BRIEF DESCRIPTION OF THE DRAWINGS

FIG. 1 illustrates the refractive index as a function of wavelength of sol-gel monoliths according to an embodiment of the invention.

DESCRIPTION OF THE EMBODIMENTS

Exemplary embodiments according to the present invention will be described below.

(Sol-Gel Synthesis Using an Epoxide)

To make a metal oxide organic compound composite, an epoxide can be used in a sol-gel process. According to one aspect of the invention, the process includes a dissolving step (a), and a drying step (b).

(a) Dissolving Step

According to one aspect, a metal chloride and an epoxide are dissolved in a solvent in the presence of water to obtain a gel including the metal oxide organic compound composite. Specifically, a metal salt is dissolved in a suitable solvent. Water can either be added separately or may already be included in the salt as water of hydration. The obtained solution is stable, until an epoxide is added. A mixture including the metal chloride, the epoxide, and the solvent can be aged. Metal ions are Lewis acids, and the hydrogens from their aqueous shell are easily abstracted, therefore acting as Broensted acids and lowering the pH of the solution (See a chemical reaction [1] below).

The epoxide increases the pH of the solution by binding $H^+$ through a ring opening reaction. The metal oxide becomes insoluble and phase separates, resulting in the formation of a hydrogel. The removal of $H^+$ from the solution is only the favored reaction if the counterion is a better nucleophile than water (See chemical reactions [2] to [4]). The solvent can be selected from, for example, one or more of absolute methanol, ethanol, and water. A hydrated metal chloride (ex., yttrium chloride) liberates a hydrogen ion as described in the reaction [1], that can then open the epoxide ring as described in the reaction [2], as well as assist in subsequent aqueous chemistry with respect to the resulting alcohol, as described in the reactions [3] and [4]. The epoxide in the gel may be thermally or photochemically polymerized and/or cross-linked. In the reactions [2], [3], and [4], R can be selected from, for example, methyl, methacryloxymethyl, phenoxymethyl, m-(glycidyloxy)phenoxymethyl, p-(N,N-diglycidylamino)phenoxymethyl and N-glycidyl-N-(p-(glycidyloxy)phenyl)aminomethyl.

(b) Drying Step

After the dissolving step, the obtained gel is dried after an appropriate aging time to become a dense monolith which is denser than the gel before the drying step. Specifically, according to one aspect, the monolith that forms in a scintillation vial is dried at room temperature by controlled evaporation of the volatile solvent used in the dissolving process, and forms a dense void-free xerogel.

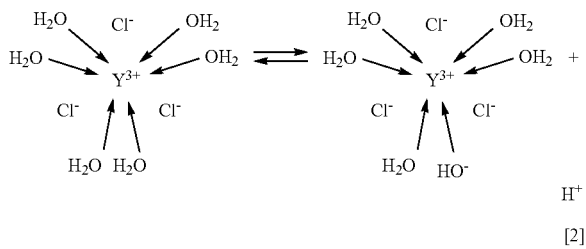

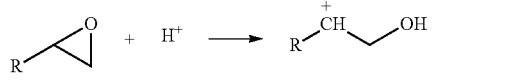

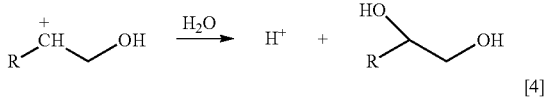

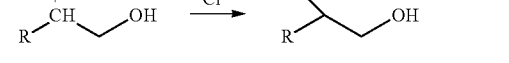

According to one aspect of the invention, to obtain a dense monolith instead of an aerogel, supercritical drying is not used, but rather drying occurs under normal pressure and temperature. In addition, the organic moieties in the composite may be chosen in order to avoid mechanical failure during drying.

After the drying step, a curing step and/or polishing step may optionally be executed.

The hydrated metal chloride can be selected from, for example, at least one of $TiCl_3 \cdot 6H_2O$, $ZrCl_3 \cdot 6H_2O$, and $YCl_3 \cdot 6H_2O$.

The epoxide catalyst can be selected from among, for example, at least one of propylene oxide, glycidyl methacrylate, resorcinol diglycidyl ether (hereinafter, "RDGE"), N,N-diglycidyl-4-glycidyloxyaniline (hereinafter, "NGA"), 1,2-epoxy-3-phenoxypropane (hereinafter, "EPP"), and cyclohexene sulfide.

Embodiment 1

Hydrated Metal Chloride

In a first embodiment, $XCl_3 \cdot nH_2O$ is used as the hydrated metal chloride, where X can be Y, Ti, Zr, Lu, Sc, or La, and where n, the number of hydrated water, depends on the metal species used.

The formation of the monoliths takes place via a sol gel route. A metal halide salt (e.g. $XCl_3 \cdot nH_2O$) is dissolved in a polar solvent like water or standard alcohols. $X^{3+}$ is a strong Lewis acid, therefore the pH of the solution is decreased. When an acid scavenger like propylene oxide, glycidyl methacrylate or any other organic compound with an epoxide functionality is added to the solution, the pH increases and the solubility of $X^{3+}$ ions is decreased. Together with the hydrated water a metal oxidic gel is formed, and this formation can occur in a mold. The gel can be dried to form a denser monolith, also known as a xerogel.

A mechanism for the reaction is disclosed by using chemical reactions [1] to [4] above for the case of X═Y (yttrium). In the reaction [1], $YCl_3 \cdot 6H_2O$ is shown in equilibrium with its deprotonated state, the created proton decreasing the pH of the solution. The proton then reacts with an available epoxy group and an intermediate is formed. After this stage, two reactions are possible. The intermediate can react with available water to form a diol with another proton being created Product A (reaction [3]). This does not lead to an increase of the pH. The other possibility is that the intermediate reacts with a chloride ion to form Product B (reaction [4]). No proton is created in this case, and since a proton is used up at the beginning of the reaction, the pH increases. Yttrium trichloride is still soluble at high pH but yttrium oxide is not, thus yttrium oxide starts to precipitate and forms a gel.

Embodiment 2

In a second embodiment, for example, $YCl_3 \cdot 6H_2O$ is used as the hydrated metal chloride. The sol-gel synthesis process comprises a step for dissolving $YCl_3 \cdot 6H_2O$ and an epoxide in a solvent to obtain a gel, and a step for drying the gel. The epoxide may comprise one or more of the epoxides described above, such as for example propylene oxide and/or glycidyl methacrylate.

The solvent may include alcohols. In addition to the alcohol, a material, which has a high refractive index compared to the epoxide, such as the propylene oxide and/or glycidyl methacrylate, may be included in the solvent. According to one aspect, to control the refractive index of the gel after the dissolving process, a washing step can be applied to the sol-gel synthesis process as described later.

An exemplary process for the glycidyl methacrylate catalyzed synthesis of an yttrium oxide rich sol-gel is as follows:
(1) Dissolving $YCl_3 \cdot 6H_2O$ in absolute methanol in a closed sealed vial.
(2) Adding glycidyl methacrylate with a small amount of a radical photoinitiator, such as Irgacure 184 and Irgacure 369. After the drying step the gel can be stabilized by UV-curing the organic parts of the monolith.
(3) Gelation occurs in 1 hr.
(4) Aging at room temperature for several days, or several weeks, as necessary.
(5) At completion of the drying process, the sample can be exposed with UV light (20 mW/cm$^2$) for 15 min.

The disclosed process for yttrium oxide sol-gels can be executed at relatively low temperature.

After the UV exposure step, a sample of thick sol-gel monolith can be obtained. The thickness of the sample can be approximately 1 mm. The epoxide, glycidyl methacrylate, was found to be able to provide both a catalytic functionality and a cross-linked organic network for increasing the strength of the yttrium oxide portion. Thick samples of the metal oxide organic compound composite could be made by using glycidyl methacrylate. Some of the samples have optical properties given by $n_D$=1.55 and $V_D$=40 ($n_D$ is the refractive index at 589 nm, and $V_D$ is the Abbe number).

To change or control the refractive index of the sample, a washing step can be introduced to the disclosed sol-gel synthesis process. Specifically, after gelation occurs in the presence of an epoxide having a first refractive index to obtain a gel and before the drying process, the washing step can be executed to wash the gel with another solution including another material having a second refractive index different from the first refractive index of the epoxide. The washing step might be applied even after the drying step.

The first refractive index of the gel can be increased by the execution of the washing step. In short, the refractive index of the gel can be controlled. The material used in the washing step can comprise an organic compound including at least one substituent group selected from the group consisting of sulfur, chlorine, bromine, iodine, and aromatic ring.

Through the washing step, the epoxide can be replaced with a material whose refractive index is different from that of the epoxide. Therefore, the washing step can be called an active washing process.

In the active washing process, the epoxide which reacted and/or didn't react during gelation may be replaced with a second material used in the washing step. Therefore, the active washing process can change the optical properties of the obtained gel.

The replacement material can be thermally or photochemically cured. This leads to the formation of a polymeric network that stabilizes the gel.

Photochemical curing involves the formation of reactive species from a photoinitiator upon the illumination of the material with light of a certain wavelength. The reactive species reacts with the replacement material and initiates a polymerization.

In thermal curing the formation of reactive species happens at elevated temperatures. The replacement material can be at least one member selected from the group consisting of benzyl methacrylate, styrene, trimethylolpropane triacrylate (TMPTA), RDGE, NGA, and EPP. "RDGE" is described by the following chemical formula [5]. These replacement materials might be added into a solution used for dissolving the metal chloride. For example, the solution used for dissolving the metal chloride can comprise at least one of benzyl methacrylate, styrene, and trimethylolpropane triacrylate (TMPTA). The solution can also comprise an organic compound including at least one substituent group selected from the group consisting of sulfur, chlorine, bromine, iodine, and aromatic ring.

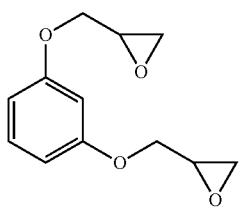

"NGA" is described by the following chemical formula [6].

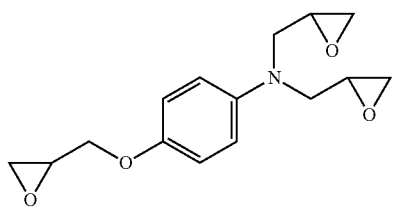

"EPP" is described by the following chemical formula [7].

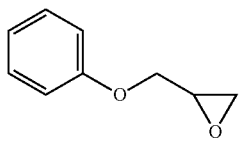

The detailed examples are described below.

Example 1

$YCl_3 \cdot 6H_2O$ 1.05 g of $YCl_3.6H_2O$ are dissolved in 2.5 ml of dry methanol in a 20 ml vial. 1.95 g of gylcidyl methacrylate and 0.025 g of Irgacure 184 are added. Gelation occurs within 24 h. The vial is opened after gelation to let the methanol evaporate and the gel shrinks. The appearance of the obtained monolith is yellow, and hard.

After the drying process the monolith is cured under a UV source in an argon atmosphere for 30 min. After curing the monolith is polished on both sides.

Example 2

Active Washing Process

The active washing process is used to change the refractive index of the gel. A solution of curable monomer and photoinitiator dissolved in the solvent used during the sol gel process is added to the undried hydrogel. Through diffusion the epoxide is removed from the gel and the monomer is incorporated into the gel.

The gels were prepared according to the description of the Example 1, and before the drying process, one of the gels was washed by using a methanol based solution of benzyl methacrylate and Irgacure 184, described in detail below (Example Y2-1). In FIG. 1, a graph comparing the refractive indices of two gels made with epoxides of similar refractive index is shown. One of the gels was actively washed (illustrated in circles), and the other one was not washed (illustrated in squares).

Example 3

$TiCl_4$ 1.88 g of $TiCl_4$ was dissolved in 5 mL of dry ethanol, which results in a high exothermic reaction. As soon as the mixture is cooled down, 1.03 g of water was added, causing the mixture to become warm again. After this 0.9 g of resorcinol diglycidyl ether (RDGE) was added to the mixture resulting in a further exothermic reaction. The solution was allowed to gel at ambient temperature for 6 days, and then a yellowish low-haze gel was obtained.

Further, the monolith was soaked in 10 mL of dry methanol for 1 day, which was twice repeated. Next, the monolith was soaked for 1 day in 10 mL of the washing solution which was prepared from benzyl methacrylate (31.7 g, 180 mmol), Irgacure 184 (2.11 g, 10.3 mmol), and dry methanol (120 mL). This treatment was repeated three times. The resulting gel was dried at ambient temperature to give a yellowish slightly-hazy solid.

Example Y2-1

1.007 g (3.32 mmol) of $YCl_3.6H_2O$ was dissolved in 2.5 mL of dry methanol, and 0.426 g (7.33 mmol) of propylene oxide was added to the solution. After vigorous shaking, the solution was allowed to gel at ambient temperature for 6 days, and then a colorless low-haze gel was obtained.

Further, the monolith was soaked in 10 mL of dry methanol for 1 day, which was twice repeated. Next, the monolith was soaked for 1 day in 10 mL of the washing solution which was prepared from benzyl methacrylate (31.7 g, 180 mmol), Irgacure 184 (2.11 g, 10.3 mmol), and dry methanol (120 mL). This treatment was repeated three times. The resulting gel was dried at ambient temperature to give colorless slightly-hazy solid.

Example Y2-7

1.005 g (3.31 mmol) of $YCl_3.6H_2O$ was dissolved in 2.5 mL of dry methanol, and 0.750 g (12.9 mmol) of propylene oxide was added to the solution. After vigorous shaking, the solution was allowed to gel at ambient temperature for 6 days, during which time, a colorless clear gel formed.

Further, the monolith was soaked in 10 mL of dry methanol for 1 day, which was twice repeated. Then, the monolith was soaked for 1 day in 10 mL of the washing solution which was prepared from 1,3-dithiole-2-thione (1.00 g, 7.45 mmol), benzyl methacrylate (9.00 g, 51.1 mmol), Irgacure 184 (0.701 g, 3.43 mmol), and dry methanol (40 mL). This treatment was repeated three times. The resulting gel was dried at ambient temperature to give a light-orange clear solid.

Example Y3-1

1.048 g (3.45 mmol) of $YCl_3.6H_2O$ was dissolved in 2.5 mL of dry methanol, and 0.405 g (6.97 mmol) of propylene oxide was added to the solution. After vigorous shaking, the solution was allowed to gel at ambient temperature for 3 days, during which time, colorless low-haze gel formed.

Example Y3-7

1.070 g (3.53 mmol) of $YCl_3.6H_2O$ was dissolved in 2.5 mL of dry methanol, and 0.506 g (8.71 mmol) of propylene oxide was added to the solution. After vigorous shaking, the solution was allowed to gel at ambient temperature for 3 days, during which time, a colorless slightly-hazy gel formed.

Example Y4-1

1.052 g (3.47 mmol) of $YCl_3.6H_2O$ was dissolved in 2.5 mL of dry methanol, and 0.592 g (10.2 mmol) of propylene oxide was added to the solution. After vigorous shaking, the solution was allowed to gel at ambient temperature for 4 days, during which time, a colorless slightly-hazy gel formed.

Further, the monolith was soaked in 10 mL of dry methanol for 1 day, which was repeated twice. Then, the monolith was soaked for 1 day in 10 mL of the washing solution which was prepared from benzyl methacrylate (26.5 g, 150 mmol), Irgacure 184 (1.75 g, 8.57 mmol), and dry methanol (100 mL). This treatment was repeated three times. The resulting gel was dried at ambient temperature to give a slightly-yellow clear solid.

Example Y4-2

1.064 g (3.51 mmol) of $YCl_3.6H_2O$ was dissolved in 2.5 mL of dry methanol, and 0.691 g (11.9 mmol) of propylene oxide was added to the solution. After vigorous shaking, the solution was allowed to gel at ambient temperature for 4 days, during which time, colorless clear gel formed.

Further, the monolith was soaked in 10 mL of dry methanol for 1 day, which was repeated twice. Then, the monolith was soaked for 1 day in 10 mL of the washing solution which was prepared from benzyl methacrylate (26.5 g, 150 mmol), Irgacure 184 (1.75 g, 8.57 mmol), and dry methanol (100 mL). This treatment was repeated three times. The resulting gel was dried at ambient temperature to give a slightly-orange clear solid.

Example Y4-3

1.050 g (3.46 mmol) of $YCl_3.6H_2O$ was dissolved in 2.5 mL of dry methanol, and 0.800 g (13.8 mmol) of propylene oxide was added to the solution. After vigorous shaking, the solution was allowed to gel at ambient temperature for 4 days, during which time, a colorless clear gel formed.

Further, the monolith was soaked in 10 mL of dry methanol for 1 day, which was repeated twice. Then, the monolith was soaked for 1 day in 10 mL of the washing solution which was prepared from benzyl methacrylate (26.5 g, 150 mmol), Irgacure 184 (1.75 g, 8.57 mmol), and dry methanol (100 mL). This treatment was repeated three times. The resulting gel was dried at ambient temperature to give light-orange clear solid.

Example Y4-4

1.059 g (3.49 mmol) of $YCl_3.6H_2O$ was dissolved in 2.5 mL of dry methanol, and 0.901 g (15.5 mmol) of propylene oxide was added to the solution. After vigorous shaking, the solution was allowed to gel at ambient temperature for 4 days, during which time, a colorless clear gel formed.

Further, the monolith was soaked in 10 mL of dry methanol for 1 day, which was repeated twice. Then, the monolith was soaked for 1 day in 10 mL of the washing solution which was prepared from benzyl methacrylate (26.5 g, 150 mmol), Irgacure 184 (1.75 g, 8.57 mmol), and dry methanol (100 mL). This treatment was repeated three times. The resulting gel was dried at ambient temperature to give light-orange clear solid.

Example Y5-1

1.049 g (3.46 mmol) of $YCl_3.6H_2O$ was dissolved in 2.5 mL of dry methanol, and 0.798 g (13.7 mmol) of propylene oxide was added to the solution. After vigorous shaking, the solution was allowed to gel at ambient temperature for 3 days, during which time, a colorless clear gel formed.

Further, the monolith was soaked in 10 mL of dry methanol for 1 day, which was repeated twice. Then, the monolith was soaked for 1 day in 10 mL of the washing solution which was prepared from 1,3-dithiole-2-thione (1.00 g, 7.45 mmol), benzyl methacrylate (9.03 g, 51.2 mmol), Irgacure 184 (0.700 g, 3.43 mmol), and dry methanol (40 mL). This treatment was repeated three times. The resulting gel was dried at ambient temperature to give light-orange clear solid.

Example Y5-3

1.050 g (3.46 mmol) of $YCl_3.6H_2O$ was dissolved in 2.5 mL of dry methanol, and 0.802 g (13.8 mmol) of propylene oxide was added to the solution. After vigorous shaking, the solution was allowed to gel at ambient temperature for 3 days, during which time, colorless clear gel formed.

Further, the monolith was soaked in 10 mL of dry methanol for 1 day, which was repeated twice. Then, the monolith was soaked for 1 day in 10 mL of the washing solution which was prepared from cyclohexene sulfide (0.854 g, 7.48 mmol), benzyl methacrylate (9.00 g, 51.1 mmol), Irgacure 184 (0.699 g, 3.42 mmol), and 2-isopropoxyethanol (40 mL). This treatment was repeated three times. The resulting gel was dried at ambient temperature to give a colorless clear solid.

Example Y5-5

1.054 g (3.47 mmol) of $YCl_3.6H_2O$ was dissolved in 2.5 mL of dry methanol, and 0.803 g (13.8 mmol) of propylene oxide was added to the solution. After vigorous shaking, the solution was allowed to gel at ambient temperature for 3 days, during which time, a colorless clear gel formed.

Further, the monolith was soaked in 10 mL of dry methanol for 1 day, which was repeated twice. Then, the monolith was soaked for 1 day in 10 mL of the washing solution which was prepared from benzyl methacrylate (21.17 g, 120 mmol) and Irgacure 184 (1.401 g, 6.86 mmol). This treatment was repeated three times. The resulting gel was dried at ambient temperature to give light-orange clear solid.

Example Y5-6

1.053 g (3.47 mmol) of $YCl_3.6H_2O$ was dissolved in 2.5 mL of dry methanol, and 0.798 g (13.7 mmol) of propylene oxide was added to the solution. After vigorous shaking, the solution was allowed to gel at ambient temperature for 3 days, during which time, colorless clear gel formed.

Further, the monolith was soaked in 10 mL of dry methanol for 1 day, which was repeated twice. Then, the monolith was soaked for 1 day in 10 mL of the washing solution which was prepared from cyclohexene sulfide (1.708 g, 15.0 mmol), benzyl methacrylate (18.01 g, 102 mmol), and Irgacure 184 (1.419 g, 6.95 mmol). This treatment was repeated three times. The resulting gel was dried at ambient temperature to give a slightly-orange clear solid.

It was found that the ratio of propylene oxide in the solution can affect transparency of the gel, according to the examples of Y2-1, Y2-7, Y3-1, Y3-7, Y4-1, Y4-2, Y4-3, and Y4-4. More transparent materials may be fabricated by increasing the ratio of propylene oxide used in the gelation process.

It is also found that using organic washing compound(s) containing at least one of sulfur atoms, halogen atoms except for fluorine, and aromatic rings and soaking the obtained gel with said organic compounds are effective.

The described method may realize a desired monolith with high refractive index and/or high Abbe number produced through a low temperature process (ex. room temperature). Glass material with similar properties is usually produced by using a process at several hundred to thousands of degrees. The described synthetic method may be used for incorporating organic and/or inorganic functionality into the $Y_2O_3$ network structure. For example, dyes for sensing, coloring, or laser applications can be introduced into the $Y_2O_3$ network structure. The mechanical and/or optical properties of the xerogel may be controlled.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method for producing a metal oxide organic compound composite comprising:
   combining a metal chloride and an epoxide in a solvent, wherein water is present in at least one of (i) the solvent and (ii) a water of hydration of the metal chloride, to form a gel, the metal chloride comprising titanium chloride and the epoxide having a first refractive index; and
   replacing the epoxide having the first refractive index in the gel with a material having a second refractive index different from the first refractive index.

2. The method for producing the metal oxide organic compound composite according to claim 1,
   wherein the epoxide having the first refractive index in the gel is replaced with the material having the second refractive index different from the first refractive index by washing the gel with a solution including the material having a second refractive index different from the first refractive index.

3. The method for producing the metal oxide organic compound composite according to claim 1,
   wherein the metal chloride comprises titanium chloride and water of hydration.

4. The method for producing the metal oxide organic compound composite according to claim 1,
   wherein water is added to the solvent prior to obtaining the gel.

5. The method for producing the metal oxide organic compound composite according to claim 1,
   wherein the material having the second refractive index different from the first refractive index comprises a polymerization initiator and a radically polymerizable compound.

6. The method for producing the metal oxide organic compound composite according to claim 5,
   wherein the polymerization initiator is a photopolymerization initiator.

7. The method for producing the metal oxide organic compound composite according to claim 5, further comprising polymerizing the radically polymerizable compound.

8. The method for producing the metal oxide organic compound composite according to claim 1, wherein the epoxide having the first refractive index comprises at least one of a glycidyl methacrylate, resorcinol diglycidyl ether, and propylene oxide, and the material having the second refractive index different from the first refractive index comprises at least one of benzyl methacrylate, 1,3-dithiole-2-thione, and cyclohexene sulfide.

* * * * *